United States Patent [19]

Bauer et al.

[11] Patent Number: 5,452,644
[45] Date of Patent: Sep. 26, 1995

[54] VACUUM BRAKE POWER BOOSTER

[75] Inventors: Jurgen Bauer, Wiesbaden; Kai-Michael Graichen, Langen, both of Germany

[73] Assignee: ITT Automotive Europe GmbH, Germany

[21] Appl. No.: 307,602

[22] Filed: Sep. 16, 1994

[30] Foreign Application Priority Data

Mar. 16, 1992 [DE] Germany .............. 42 08 384.2

[51] Int. Cl.⁶ .................................................. F15B 9/10
[52] U.S. Cl. ............................................. 91/376 R; 91/389
[58] Field of Search .................... 60/552, 327, 554; 91/369.1, 369.2, 369.3, 376 R, 389

[56] References Cited

U.S. PATENT DOCUMENTS

| 3,807,280 | 4/1974 | Green et al. | 91/376 R |
| 4,671,167 | 6/1987 | Endo et al. | 91/389 |
| 5,176,063 | 1/1993 | Levrai et al. | 91/369.2 |
| 5,293,808 | 3/1994 | Rueffer et al. | 91/376 R |

FOREIGN PATENT DOCUMENTS 3941604  6/1991  Germany .

*Primary Examiner*—F. Daniel Lopez
*Attorney, Agent, or Firm*—Dykema Gossett

[57] ABSTRACT

In order to be able to adjust the distance between a reaction disc and a second part of a a two-part valve piston interacting with the former in a completely assembled vacuum brake power booster, a tubular sleeve is provided according to the invention which is disposed coaxially with a piston rod actuating the valve piston, which is axially slidable and which is engageable with a first part of said valve piston being coupled to the second part by means of a threaded union in order to apply a torque to the first piston part.

22 Claims, 3 Drawing Sheets

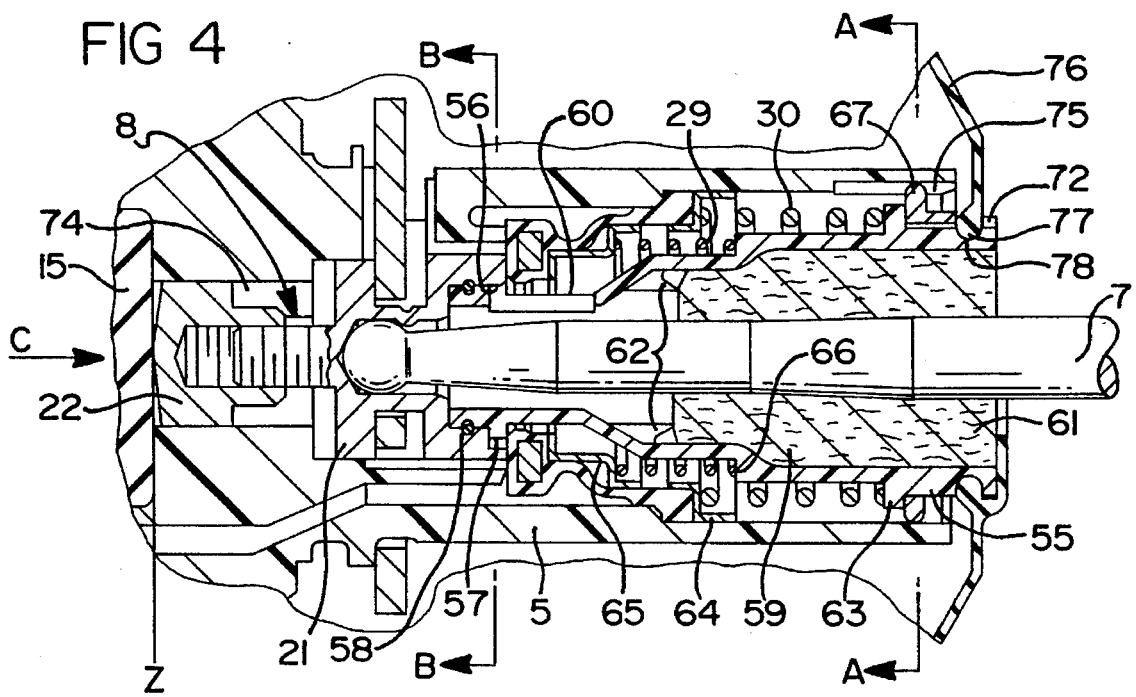
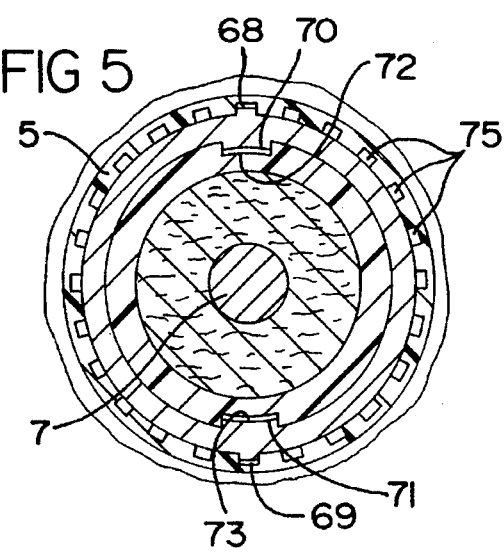
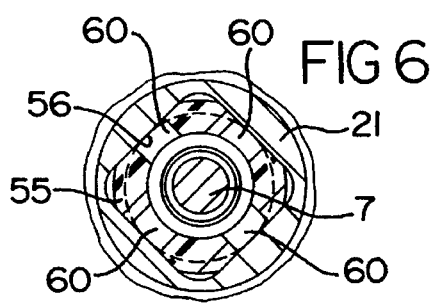
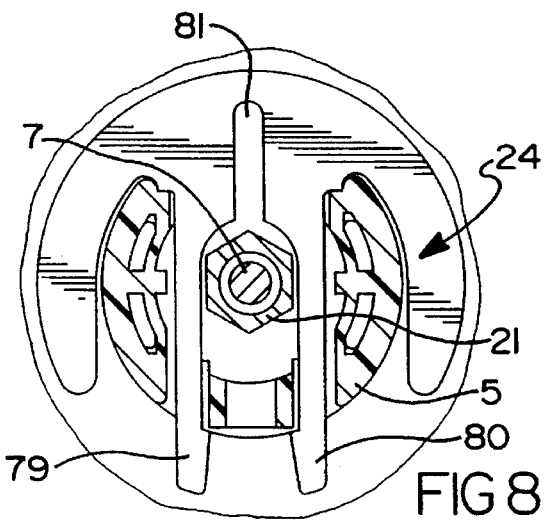

VACUUM BRAKE POWER BOOSTER

TECHNICAL FIELD

The invention is related to vehicle brake systems and more particularly to a vacuum brake power booster.

BACKGROUND OF THE INVENTION

In series manufacture of vacuum brake power boosters it is necessary to adjust the difference between the reaction disc and the second piston part, that is to say, the so-called parameter z, in order to obtain the characteristic curves demanded by the automobile industry. Indeed, the parameter z to be adjusted determines the behavior of the booster in the initial phase of its actuation, in particular the extent of the jump of the output force when being actuated with an established input force (so-called jumper effect).

In an adjustable vacuum brake power booster which is known from the German patent application published without examination, No. 3,641,604, the adjustment of the desired parameter z is carried out when the piston rod is not incorporated, which is pressed into an elastic ring-shaped piston rod holder positioned in the first piston part. In the prior art vacuum brake power boosters the piston rod holder which is made of elastic material cannot transmit any elevated plucking-out forces which are demanded by the automotive vehicle manufacturer.

SUMMARY OF THE INVENTION

It is, therefore, the object of the present invention in a vacuum brake power booster to indicate provisions which allow the desired parameter z to be adjusted when the gear is in the completely assembled condition.

A first inventive solution of the aforementioned object consists in that a tubular sleeve arranged coaxially with the piston rod so as to be slidable in axial direction is provided which is engageable with the first piston part in order to render possible the latter's rotation in the sense of an adjustment of the axial length of the valve piston when the vacuum brake power booster is in the assembled condition.

Within the framework of a second inventive solution it is proposed that to said first piston part a tubular sleeve being arranged coaxially with the piston rod is coupled in a positive locking engagement which renders possible a rotation of the first piston part in the sense of an adjustment of the axial length of the valve piston when the vacuum brake power booster is in the assembled condition and which is secured against rotation within the control housing upon the adjustment.

Further details and advantageous features of the invention will be revealed by the subclaims and by the undermentioned description of two embodiments making reference to the accompanying drawing.

BRIEF DESCRIPTION OF THE DRAWINGS

FIG. 4 shows the control group of a vacuum brake power booster after the adjustment which is set up according to the second solution.

FIG. 5 shows the cross section along the sectional line A—A in FIG. 4.

FIG. 6 shows the cross section along the sectional line B—B in FIG. 4.

FIG. 7 shows a view from the direction "C" in FIG. 4 (without reaction disc).

FIG. 8 shows a potential design variant of the valve piston range shown in FIG. 4.

DETAILED DESCRIPTION OF THE PREFERRED EMBODIMENTS

Figure 1:
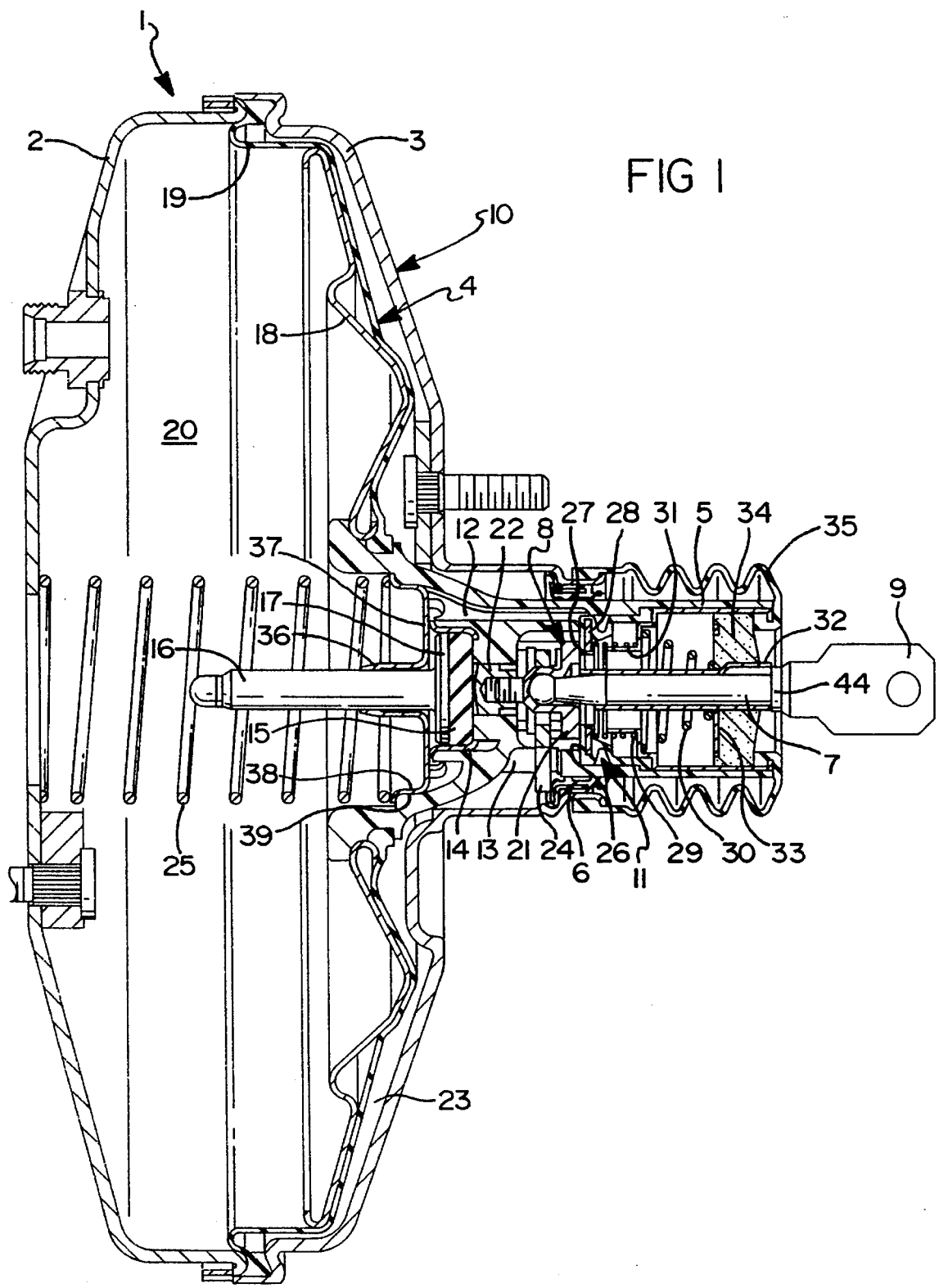
FIG. 1 shows an axial section of a vacuum brake power booster which is set up in accordance with the first solution.

The booster housing 10 of the inventive vacuum brake power booster 1 which is illustrated in FIG. 1 is composed of two housing parts 2, 3 being engaged with each other in a coupling plane by providing indentations. The interior space of the booster housing 10 is subdivided by a movable wall 4 into a vacuum chamber 20 which is connected to a vacuum source (not shown in more detail in the drawing) through a pneumatic connection and into a power chamber 23.

The movable wall 4 which is formed by a metal diaphragm disc 18 and by a rolling diaphragm 19 being abutted against it in the power chamber 23 is fixed to a control housing 5 which seals off the power chamber 23 toward the outside with a sliding guide ring 6.

In the interior space of the control housing 5 a control rod being composed of a piston rod 7 and a valve piston is disposed so as to be axially slidable which is connectible to a brake pedal of an automotive vehicle through a forkhead 9. The control housing 5 accommodates, furthermore, a control valve 11 which is actuated by the valve piston 8 and which controls the pressure differential between the vacuum chamber 20 and the power chamber 23 through air guide ducts 12, 13. The control housing 5 is, in addition, furnished with a stepped bore 14 within whose section having a larger diameter a reaction disc 15 and a head flange 17 of a pressing rod 16 are accommodated which latter actuates a master brake cylinder which is fixed to the front side of the booster housing 10 and is not shown in more detail in the drawing.

For the return of the movable wall 4 a return spring 25 is provided which is clamped in between the control housing 5 and the bottom of the booster housing 10, respectively 2.

In this configuration, the valve piston 8 which in the release position strikes against the sliding guide ring 6 through a transverse member 24 is preferably configurated in two-parts - - - a first piston part 21 (being coupled to the piston rod 7) and a second piston part 22 (which is connected to the first piston part 21 by means of a threaded union). Second piston part 22 is positioned within a second section of the stepped bore 14 having a smaller diameter so as to be secured against rotation as well as to be guided in radial direction and to be slidable in axial direction and whose surface is in contact with the reaction disc 15 determines the ratio of the power brake unit. The distance z between the second piston part 22 and the reaction disc 15 constitutes a functionally important parameter of the brake power booster whose importance will be explained in more detail in the following text.

The control assembly of the vacuum brake power booster is illustrated in the stand-by position, that is to say, in a position in which the two chambers 20, 23 are separated from each other. In this position both sealing seats 26, 27 of the control valve 11 are, indeed, abutted against the sealing surface of a poppet valve 28 which is prestressed in the direction of the two sealing seats 26, 27 by means of a poppet valve spring 29. The sealing seat 27 which is configurated at the first piston part 21 is urged against the poppet valve 28 by a piston rod return spring 30. The piston rod return spring 30 is supported, at one end, at a sleeve-shaped popper valve holder 31 at which simultaneously the poppet valve spring 29 is supported. With its other end the piston rod return spring 30 is supported at a tubular sleeve 32 which is positioned coaxially with the piston rod 7 so as to be slidable in axial direction and which is abutted axially against an annular collar 44 being configurated at the piston rod 7. Against the sleeve 32 a ring-shaped disc 33 is abutted which serves as an abutment means for an air filter 34 being positioned in the suction range of the control housing 5 and being retained by a ring-shaped torus coupled into the poppet valve holder and making part of a dust cover 35 which protects the control housing 5.

In order to precisely guide the pressing rod 16, a guide sleeve 36 is provided whose radial flange 37 is supported at the control housing 5 and which passes over into cylindrical guide surface 38. Guide sleeve 36 interacts with a cylindrical section 39 which is configurated at the control housing 5, so that the bending forces acting upon pressing rod 16 efficiently absorbed. The radial flange 37 which is furnished with a plurality of openings in the range of the mouth of the air guide duct 12 is secured against falling-out by the return spring 25 which is supported at a radial collar succeeding the cylindrical guide surface 38 and not identified in more detail.

Figure 2:
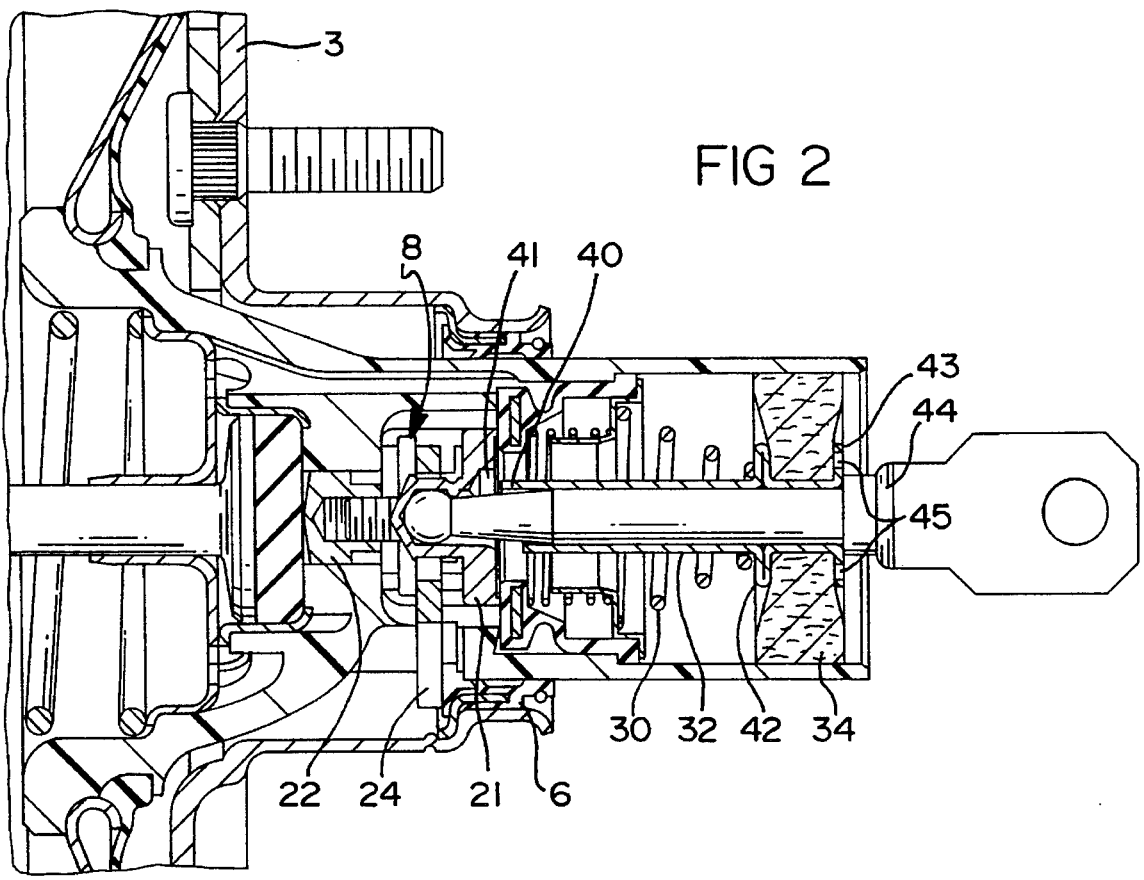
FIG. 2 shows an axial part-section of the slightly modified control group of the vacuum brake power booster in FIG. 1.

Now referring to FIG. 2, the sleeve 32 is formed (at its end facing the valve piston 8) with preferably two projections (or noses) 40 which are disposed radially opposite each other and which are introducible into matching cutouts (or depressions) 41 being provided in the first piston part 21. In this context, it will be necessary to configurate the sleeve 32 such that it is capable of transmitting a torque. The end of the sleeve 32 (shown in FIG. 1 which faces away from the valve piston 8) is, for example, furnished with a salient polyhedral section. The sleeve 32 which is illustrated in FIG. 2 is formed instead with two radial extensions 42, 43 which are configurated at a distance from each other and between which the air filter 34 is disposed. At the extension 42 (which is positioned nearer to the valve piston 8) the piston rod return spring 30 takes support, while the extension 43 which is axially abutted against the annular collar 44 of the piston rod 7 is formed with two openings 45 disposed radially opposite each other into which an adjusting tool supplying the torque is introducible.

Figure 3:
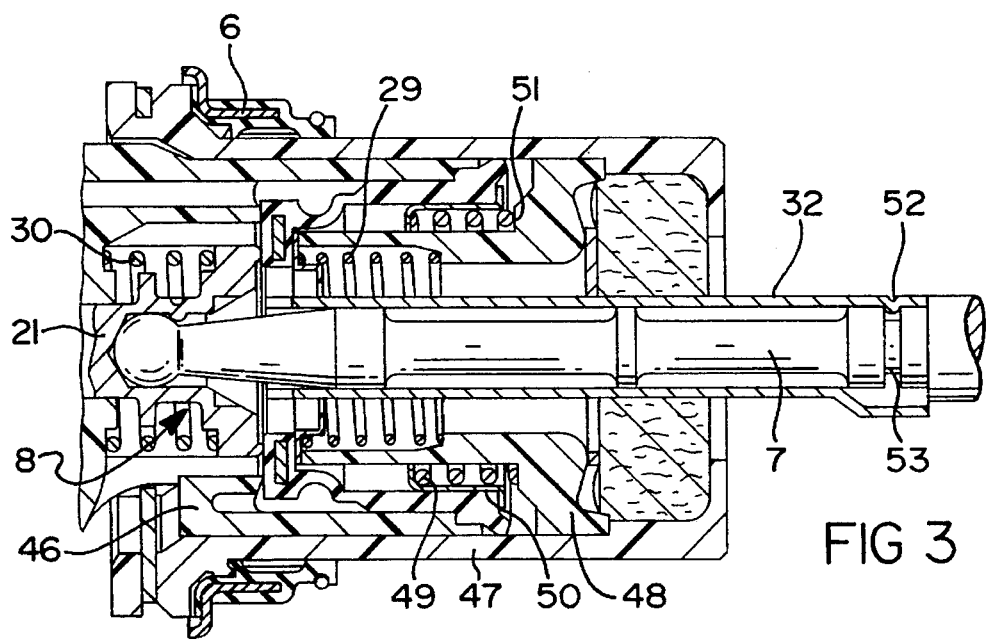
FIG. 3 shows a third version of the control group of the vacuum brake power booster according to the invention shown in FIG. 1.

In the design variant shown in FIG. 3 the control housing 5 of the inventive vacuum brake power booster 1 is configurated in two-parts and consists of a first control housing part 46 which bears the movable wall not shown in the drawing and which guides the valve piston 8 and of a second control housing part 47 which is abutted in axial direction against a sliding guide ring 6 sealing off the booster housing 10. In the illustrated version the piston rod return spring 30 is clamped between the first piston part 21 and the first control housing part 46, whereas the poppet valve spring 29 takes support at a stop bushing 48 which interacts with the poppet valve 28 and which is retained within the second control housing part 47.

In addition, a third compression spring 49 is provided which is supported, on one side, by a guide 50 of the popper valve 28 and, on the other side, by a ring-shaped surface 51 of the stop bushing 48 and which keeps apart the two control housing parts 46, 47.

In order upon the end of the adjusting procedure to fix the sleeve 32 on the piston rod 7, the sleeve 32 is provided at its end that faces away from the valve piston 8 with at least one mortise 52 which engages an annular groove 53 being configurated in the piston rod 7 and which prevents an axial shift of the sleeve 32 on the piston rod 7.

When adjusting the desired distance z, z=o in the illustrated example, the booster housing 10 of the inventive vacuum brake power booster will be connected to a vacuum source which is not shown in the drawing and, for that matter, in such a manner that the operating pressure comes to exist within the booster housing 10 which occurs in the position of rest of the vacuum brake power booster. Thereupon a previously stipulated input force of, for example, 300N will be transmitted to the piston rod 7. As a result, the valve piston 8 will be shifted thereby ventilating the power chamber 23, so that a boosting power will be built up which is added to the input force applied at the piston rod 7 and is measured at the pressing rod 16 as the output force.

If it is revealed by the measurement that the output force value is out of a range previously established, then an adequate correction of the parameter z will be required in the event of the realization of which the relative position of the second piston part 22 and of the first piston part 21 will be modified. To this end the sleeve 32 shown in FIG. 1 or in FIG. 2 will be introduced into the depressions 41 provided for this purpose in the first piston part 21 with the aid of a suitable adjusting tool, counteracting the action of the piston rod return spring 30. Subsequently a torque will be applied to the sleeve 32 and the first piston part 21 will be rotated until an output force value falling within the desired scatter is reached. When the desired parameter z has been adjusted the adjusting tool will be removed simultaneously eliminating the axial sliding force which acts upon the sleeve 32, so that under the prestressing action of the piston rod return spring 30 the sleeve 32 will automatically come to be abutted against the annular collar 44 of the piston rod 7.

The second piston part 22 which is coupled to the first piston part 21 through a threaded union is secured, for example, by a hexagon section against rotating along with the first piston part 21.

Any unintentional rotation of the two piston parts 21, 22 relative to each other can be prevented in that the threaded union is provided with a means securing it against turning loose. Such provisions consist, for example, in that the threaded union is configurated in the shape of a self-locking thread, that is to say, the threads of the first piston part 21, respectively of the second piston part 22 present different pitches, diameters, respectively screw thread angles. Additionally, it can be imagined to secure the threaded union by microencapsulated adhesive or by a protecting varnish coat or a thread formation.

In the design variant of the inventive thought shown in FIGS. 4 to 8 the adjustment of the desired parameter z is carried out by means of a tubular sleeve 55 of larger diameter which is disposed coaxially with the piston rod 7 and is coupled to the first piston part 21 by positive locking engagement. For this purpose the end of the sleeve 55 which engages a correspondingly shaped axial recess 56 in the first piston part 21 is configurated as a polyhedron, for example, as a square 57 and secured against an axial shift in the first piston part 21 by means of a locking ring 58. In this context, it will be particularly reasonable if the sleeve 55 is configurated such that it defines a pneumatic duct of flow 59 within the control housing 5, which former affords an influx of air into the control valve 11. In its range facing the valve piston 8 the sleeve 55 is furnished for this reason with a plurality of axial openings 60 which are uniformly distributed over the circumference. In this configuration, an air filter 61 is disposed in said duct of flow 59 which former is secured against an axial shift by projections, respectively noses 62 being positioned within the sleeve 55 and extending radially inwardly. On its surface the sleeve 55 is furnished with a radially outwardly extending collar 63 at which the piston rod return spring 30 is supported which is abutted with its end against a relatively short poppet valve holder 64. The poppet valve spring 29 mentioned before is clamped in between a poppet valve guide 65 and a radial annular surface 66 which is configurated at the sleeve 55.

In order to be able to fix the sleeve 55 on the end of the adjusting procedure, an annular retaining element 67 is provided which can be slipped onto the sleeve 55. Said retaining element 67 is formed both with two first projections 68, 69 which are configurated such as to be disposed radially opposite each other on its external circumference and which extend outwardly and with two ring segment-shaped guide surfaces 70, 71 which are configurated on its internal circumference such as to be disposed opposite said first projections 68, 69 and which allow to be introduced into axial grooves 72, 73 being molded out in the sleeve 55.

In the design version which is illustrated in FIGS. 4 to 8 the adjustment of the desired parameter z is realized by applying a torque at the end of the sleeve 55 facing away from the valve piston 8. The torque applied is transmitted through the positive locking coupling between the sleeve 55 and the first piston part 21 by means of the square 57 and through the threaded union between the two piston parts 21, 22 to the second piston part 22. Because the second piston part 22 is guided within the control housing 5 so as to be secured against rotation by a polyhedron (e.g. by a hexagon 74 in the illustrated embodiment) the rotary motion is transformed into a translatory motion which affords a regular adjustment of the distance between the reaction disc 15 and the front surface of the second piston part 22.

Upon the end of the adjusting procedure the sleeve 55 is secured against rotation by its positive locking engagement with the control housing 5. On its internal circumference the control housing 5 is furnished for this purpose with uniformly distributed grooves 75 which when plugging the retaining element 67 onto the sleeve 55 will accommodate the projections 68, 69 which are molded to said retaining element 67. The retaining element 67 will so come in abutment against the side of the collar 63 molded to the sleeve 55 which faces away from the piston rod return spring 30 and will subsequently be retained by a ring-shaped torus 77 of an elastic protecting cap 76 which protects the control housing 5 from mud, the torus is buttoned into a circumferential groove 78 being configurated in the sleeve 55.

FIG. 8 shows, finally, another possibility of realizing the means to secure the first piston part 21 against turning loose, which is in abutment against the transverse member 24 in the release position of the brake power booster. For this purpose the range of the first piston part 21 situated between two arms 79, 80 of said transverse member 24 is configurated in the shape of a polygonal section while the transverse member 24 is provided with a recess 81 which allows the two arms 79, 80 to be urged apart for a brief period. In the event of a rotation of the first piston part 21 the elastic arms 79 and 80 of the transverse member 24 will be urged outward, the torque required for this being considerably higher than the resetting torque which occurs during the operation of the inventive brake power booster. It will, thus, not be possible that the two piston parts 21, 22 become detached spontaneously.

We claim:

1. A vacuum brake booster assembly, comprising:

a booster housing sealingly divided by a movable wall, into a vacuum chamber and a power chamber, a control valve for controlling a pressure differential across said movable wall, a valve piston coupled to said control valve for actuating said control valve, a piston rod abutting said valve piston for sliding said piston, wherein said valve piston is comprised of a first piston part that abuts said piston rod and a second piston part, threadedly engaged to said first piston part, a tubular sleeve arranged coaxially with said piston rod and slideable in an axial direction, said tubular sleeve engaging said first piston part for rotating said first piston part relative to said second piston part, whereby rotating said first piston part adjusts an axial placement of the second piston part which in turn axially adjusts a relative position of said valve piston 2. A vacuum brake power booster as claimed in claim 1, further including means for disengaging said sleeve from said first piston part upon the axial adjustment of the relative position of said valve piston.

3. A vacuum brake power booster as claimed in claim 2, further including a piston rod return spring pre-stressing the said valve piston in a direction opposite to an actuating direction, wherein said sleeve is axially abutted against the said piston rod under the prestressing action of the said piston rod return spring.

4. A vacuum brake power booster as claimed in claim 2, wherein said sleeve is provided with at least one mortise which interacts with an annular groove configurated in the said piston rod.

5. A vacuum brake power booster as claimed in claim 1, wherein said sleeve is formed at an end proximate said valve piston with two axial projections which are disposed radially opposite each other and which are introducable into depressions configurated in the said first piston part.

6. A vacuum brake power booster as claimed in claim 1, wherein said sleeve has a polyhedral section.

7. A vacuum brake power booster as claimed in claim 1, wherein said sleeve includes an air filter.

8. A vacuum brake power booster as claimed in claim 7, wherein said sleeve is formed with two radial extensions which are configurated at a distance from each other and between which the said air filter is disposed, one of said extensions supporting a said piston rod return spring.

9. A vacuum brake power booster as claimed in claim 1, wherein said second piston part has a polyhedral section.

10. A vacuum brake booster assembly, comprising:

a booster housing sealingly divided by a movable wall, into a vacuum chamber and a power chamber, a control valve for controlling a pressure differential across said movable wall, a valve piston coupled to said control valve for actuating said control valve, a piston rod abutting said valve piston for sliding said piston, wherein said valve piston is comprised of a first piston part that abuts said piston rod and a second piston part, threadedly engaged to said first piston part, a tubular sleeve arranged coaxially with said piston rod and rotatable about an axis, said tubular sleeve engaging said first piston part for rotating said first piston part relative to said second piston part, whereby rotating said first piston part adjusts an axial placement of the second piston part which in turn axially adjusts a relative position of said valve piston.

11. A vacuum brake power booster as claimed in claim 10, wherein a portion of said sleeve which faces said first piston part is configured as a polyhedron and is secured against an axial shift relative to said first piston part by means of a locking ring.

12. A vacuum brake power booster as claimed in claim 10, further including a piston rod return spring pre-stressing the said valve piston in a direction opposite to an actuating direction, wherein said piston rod return spring is supported at a radially outwardly extending collar of the said sleeve.

13. A vacuum brake power booster as claimed in claim 10, wherein said sleeve is secured from rotation by an annular retaining element which is plugged onto said sleeve and which is formed with at least one radially outwardly extending projection and which extends into one of a plurality of grooves configured in an inside wall of a control housing.

14. A vacuum brake power booster as claimed in claim 13, wherein said annular retaining element is formed with two projections which are configured radially opposite each other.

15. A vacuum brake power booster as claimed in claim 13, wherein said retaining element is formed with at least one, ring segment-shaped guide surface which is introduced into a groove disposed in a surface of the said sleeve.

16. A vacuum brake power booster as claimed in claim 13, wherein said retaining element is in abutment against a side of a collar facing away from a piston rod return spring and is retained by a ring-shaped torus of an elastic protecting cap protecting the said control housing.

17. A vacuum brake power booster as claimed in claim 10 wherein a space defined in the said control housing by the said sleeve is configured as a pneumatic duct of flow which serves to allow an influx of air into the said control valve.

18. A vacuum brake power booster as claimed in claim 17, wherein said sleeve is furnished with radial openings.

19. A vacuum brake power booster as claimed in claim 17, further comprising an air filter disposed in the said duct of flow.

20. A vacuum brake power booster as claimed in claim 19, wherein said sleeve is formed with projections which are positioned radially and which prevent an axial shift of the said air filter in a direction of air flow.

21. A vacuum brake power booster as claimed in claim 10, wherein said control valve is comprised of two sealing seats which are disposed coaxially with each other and by a poppet valve which interacts with the said sealing seats and which is prestressed in a direction of the said sealing seats by a poppet valve spring, wherein said sleeve is furnished with a radially externally configured annular surface at which the said poppet valve spring is supported.

22. A vacuum brake power booster as claimed in claim 10, further including a transverse member which is in abutment against a booster housing in a release position and against which the said valve piston is abutted and which is provided with two arms arranged parallel to each other and encircling said valve piston and said first piston part, wherein a portion of said first piston part situated between the said arms is configured in the shape of a polyhedron, said transverse member being provided with a recess in its part connecting the said arms, so that it is rendered possible that in the event of a rotation of the said first piston part said arms are urged apart for a brief period.

* * * * *